UNITED STATES PATENT OFFICE.

WILLARD E. CASE, OF AUBURN, NEW YORK.

SECONDARY-BATTERY ELEMENT.

SPECIFICATION forming part of Letters Patent No. 292,469, dated January 29, 1884.

Application filed February 10, 1883. (No specimens.)

*To all whom it may concern:*

Be it known that I, WILLARD E. CASE, of Auburn, Cayuga county, New York, have invented a new and useful Improvement in Secondary-Battery Elements, of which the following is a specification.

The invention consists in the electrode for storage-batteries, and in the process of making the same, more particularly hereinafter set forth.

The electrode consists of an amalgam of lead and mercury, or of an amalgam of mercury with an alloy compounded of lead and any other metal or metals, to which amalgam I add any substance capable of being acted upon in the said storage-battery to store electrical potential, and also any substance which is electrically inert in the said battery, and also has the property of occluding gases. The electrode thus formed is molded into shape in any suitable manner.

The best process which I now know of making said electrode is as follows: I first melt the lead, to which, while in a molten state, I add sufficient mercury to make a pasty amalgam. While this mass is still hot I add any suitable substance capable of storing electrical potential in the storage-battery, such as oxides or salts of lead, or finely-pulverized lead. To the resulting compound I add any substance which is inert in the battery, and at the same time is capable of occluding gases—such as pulverized charcoal or carbon—taking care to mix the several materials thoroughly together. The amount of mercury added to the lead should only be such as will completely amalgamate the metal. With regard to the proportions of lead, active material, and inert material, these should be such that the electrode, when cold, will be a firm coherent mass without tendency to crumble or crack. So much of the lead oxide or other active material should be added as that the compound shall still retain its pasty state while hot; and I have obtained very good results by adding to the mass thus formed a quantity of carbon about equal in bulk (pulverized) to the lead oxide. I do not limit myself to these, nor to any exact proportions of the ingredients, as I find that considerable latitude is possible in making the mixture, and that the above instructions are sufficient to secure good results. The electrode compounded as above stated is formed into proper shape in a suitable mold.

Instead of first melting lead only, I may begin by preparing a lead alloy consisting of lead and any suitable non-oxidizable metal or metals—such as antimony—which tends or tend to lower the fusing-point of a lead alloy containing it or them. To this alloy I add mercury to form an amalgam, as before, and then an active and an inert substance, as already set forth.

I am aware that an electrode for a secondary or storage battery, consisting of an amalgam of lead and mercury and any substance active in said battery added to said amalgam, (the said electrode therefore consisting of two elements—namely, the lead amalgam and the active substance,) is not new, and an electrode thus compounded I do not herein claim.

My electrode consists of at least three elements—namely, lead, an active substance, and an inert substance, which is also capable of occluding gases—and may consist of four elements—namely, the three above stated and the non-oxidizable metal or metals first combined with the lead to make an alloy before amalgamating. The function of the inert substance is not that of a mere diluent to increase the bulk of the electrode; but it serves several particular purposes therein—namely, it acts as a means of absorbing the hydrogen from the negative plate and the oxygen which escapes from the positive plate, and thus in a great measure prevents polarization; or, in other words, I take advantage of the well-known property of carbon and certain other substances for occluding gases. The effect of the carbon in this combination is also to render the electrode more porous, so as to allow access to the exciting-liquid to all parts of the electrode, and it furthermore acts as a conductor of electricity and diminishes the internal resistance in the electrode.

It will be apparent from the foregoing that an electrode containing the three elements aforesaid—namely, lead amalgam, active substance, and carbon—will be different in operation and results from an electrode containing only the first two elements, in that the formation of gas-bubbles on the exterior of the electrode is prevented, which gas-bubbles, as is well known, largely increase the internal resistance of the cell; and this gas, which under the above conditions would not only be wasted, but also exercise an injurious effect in the cell, becomes utilized in the interior of the electrode. In this way the electrode will give forth a stronger current for a longer time.

I claim as my invention—

1. An element or electrode for a secondary or storage battery, composed of an amalgam of lead and mercury, any substance capable of being acted upon in said battery to store electrical potential, and any substance inert in said battery and capable of occluding gases, substantially as described.

2. An element or electrode for a secondary or storage battery, composed of an amalgam of lead and mercury, any substance capable of being acted upon in said battery to store electrical potential, and carbon in pulverized or comminuted form, substantially as described.

3. The process of making electrodes for a secondary or storage battery, consisting in, first, preparing an amalgam of lead and mercury; second, then adding any substance capable of being acted upon in a secondary battery to store electrical potential; third, then adding any substance inert in said battery and capable of occluding gases; and, fourth, forming the electrode in suitable shape, substantially as described.

WILLARD E. CASE.

Witnesses:
HOWARD E. CASE,
EVA F. CASE.